Figure 1:
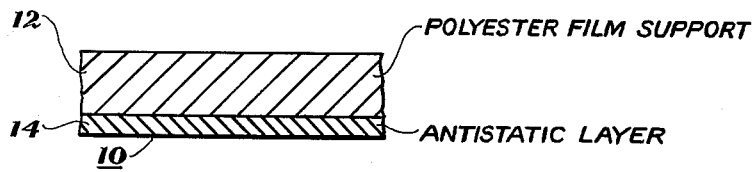

Aug. 17, 1965

G. F. NADEAU ETAL 3,201,251

COMPOSITE FILM ELEMENT

Filed Aug. 21, 1961

Gale F. Nadeau
James S. Ruoff
Crayton B. Thompson
INVENTORS

BY R. Frank Smith
Charles L. Board
ATTORNEYS

_United States Patent Office_ 3,201,251
Patented Aug. 17, 1965

3,201,251
COMPOSITE FILM ELEMENT
Gale F. Nadeau, James S. Ruoff, and Crayton B. Thompson, Rochester, N.Y., assignors to Eastman Kodak Company, Rochester, N.Y., a corporation of New Jersey
Filed Aug. 21, 1961, Ser. No. 132,712
9 Claims. (Cl. 96—87)

This invention relates to the photographic art, and particularly to photographic film. More particularly, this invention relates to a novel composite film element comprised of a film support and an applied novel antistatic layer.

The accumulation of electrical charges on photographic film has been the source of considerable problems in the photographic art. These charges are usually produced by the friction of the film moving over rollers or past the gates of a camera, or by the separation of the emulsion from the backing side, upon unreeling of a large roll of photographic film, and when discharged, are manifested as irregular fogged patterns in the emulsion of the film after it has been developed. In an attempt to overcome this tendency of photographic film to accumulate electrical charges, it has been the practice to apply to the film support various antistatic layers or backings. These layers are usually comprised of a resinous vehicle or carrier and at least one electrically conducting material. The film support with applied antistatic layer is thus provided with a layer that will dissipate any accumulated electrical charges.

Film supports prepared from polyester resins such, for example, as polyethylene terephthalate have proved highly satisfactory for use in the manufacture of photographic film products. However, the use of polyester film supports has been limited to some extent owing to the fact that it has been difficult to establish and maintain a satisfactory bond between a surface of the polyester film support and an applied antistatic layer or backing.

An object of this invention is to provide a composite film element comprised of a polyester film support and an antistatic layer, which antistatic layer is sufficiently bonded to a surface of the polyester film support to resist transfer when rolled up against photographic emulsion, but is easily and readily removable in conventional photographic developing solutions.

Another object of this invention is to provide a composition of matter comprised of a water-insoluble, alkali-soluble resinous material, an antistatic agent, and an adhesion promoter, which composition, when applied to the surface of a polyester film support, will provide a highly satisfastory bond therewith.

Another object of this invention is to provide a photographic film product comprised of the composite film element of this invention.

Other objects of this invention will, in part, be obvious and will, in part, appear hereinafter.

Figure 2:
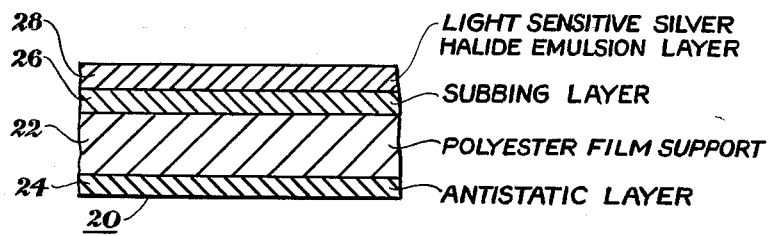

For a complete understanding of the nature and the objects of this invention, reference is made to the following detailed description and drawing, in which:

FIGURE 1 is a view in cross-section of a composite film element prepared in accordance with this invention, and FIGURE 2 is a view in cross-section of a photographic film product comprising the composite film element of this invention.

In accoradnce with this invention, there is provided a composite film element comprised of (1) a polyester film support and (2) a specific and novel antistatic layer. The antistatic layer is applied to and firmly bonded to at least one surface of the polyester film support so as to withstand abuse to which a photographic film product prepared therefrom is subjected during use, and will resist transfer when rolled up against a photographic emulsion. Further, the antistatic layer can be easily and readily removed from the surface of the polyester film support when treated in conventional alkaline photographic developing solutions and the like to provide a polyester surface relatively free of foreign materials. Thus, developed films can be stacked one upon another or convolutely wound on a reel or the like without the danger of the developed photographic emulsion adhering to the film support.

Further, and in accordance with this invention, there is provided a novel composition of matter comprised of (a) a water-insoluble, alkali-soluble resinous material, (b) an antistatic agent or compound, and (c) an adhesion promoter. This composition is applied as a coating to at least one surface of the polyester film support, using water as a vehicle or carrier therefor, and subsequently dried whereby substantially all the water from the applied coating is removed. The thus applied antistatic layer is firmly bonded to the polyester film surface. The aqueous coating composition can be applied by any conventional method such, for example, as by roll coating. The thickness of the applied coating can be controlled in any known manner as by means of doctor knives.

Polyester film supports satisfactory for use in carrying out this invention are well known in the art and can be prepared from any of the polyester compositions disclosed in Patent 2,943,937, or the polyester composition can be that disclosed in Patent 2,627,088 and in Patent 2,779,684. In carrying out this invention it is preferred that the polyester film support be biaxially stretched prior to the application to a surface thereof of the antistatic coating composition of this invention. Methods of biaxially stretching polyester film to provide an oriented film are known in the art.

A specific example of a polyester film support that has proved highly satisfactory for use in preparing photographic film products in accordance with this invention is that prepared from an ethylene glycol-terephthalic acid polyester having a melting point above about 200° C. Polyesters of this type and their method of preparation are described in Patent 2,465,319. Thus, the desired amounts of ethylene glycol and terephthalic acid are placed in a suitable reaction vessel and the polymerization is carried out under a vacuum of 0.5 mm., and at a temperature of from about 215° C. to 285° C. A molten polymer is prepared and is cast into a film of desired thickness usually of the order of from about 3 mils to 7 mils.

The water-insoluble, alkali-soluble resinous vehicle or carrier (a) employed in the novel antistatic composition of this invention can be any of those employed heretofore in antistatic layers or backings. The alkali solubility of the resin is preferred in order that it can be easily and readily dissolved or removed in conventional alkaline photographic solutions. Thus, the applied antistatic layer, while being highly adherent to the surface of the polyester film support under normal conditions of use, can be removed from the film support when an exposed film product prepared from the composite film element is subjected to conventional developing processes.

Examples of suitable water-insoluble, alkali-soluble resinous materials for use in carrying out this invention include copolymers of alkyl methacrylates and methacrylic acid, the carboxy resinic lactones, the polyinvyl phthalates, the polyvinyl acetate phthalates, and the ethyl cellulose phthalates. Other suitable resins include the cellulose organic acid esters containing dicarboxylic acid groups such as cellulose acetate phthalate, cellulose acetate maleate, cellulose acetate succinate, cellulose acetate propionate phthalate, cellulose acetate propionate maleate, and cellulose acetate propionate succinate.

The copolymers of alkyl methacrylates and methacrylic acid are preferably those comprised of from about 30 percent to 60 percent by weight of methacrylic acid and from about 70 percent to 40 percent by weight of an alkyl methacrylic such, for example, as methyl methacrylate, ethyl methacrylate, propyl methacrylate, isopropyl methacrylate, n-butyl methacrylate, t-butyl methacrylate, and mixtures thereof.

The carboxy resinic lactones, also referred to in the art as carboxy ester-lactones, suitable for use in this invention are those described in patent 2,861,056 and in application Serial No. 772,725, filed Nov. 10, 1958 now U.S. Patent No. 3,007,901. These esters are a carboxy ester of a monohydroxycarboxylic acid of the formula $C_nH_{2n-x+1}$ (OH) (COOH)$_x$ wherein $n$ is an integer in the range of 1 to 5 inclusive and $x$ is an integer in the range of 1 to 2 inclusive and a lactone of an interpolymer of vinyl alcohol and an unsaturated alpha, beta-dicarboxylic acid compound selected from the group consisting of maleic acid, fumaric acid, itaconic acid, and their anhydrides, the carboxy group of the carboxy ester being the carboxy group of said monohydroxycarboxylic acid. These esters are prepared by heating to at least about 60° C., in the presence of a mineral acid, such as sulfuric acid, about one molar proportion of an interpolymer of a vinyl organic acid ester and an unsaturated alpha, beta-dicarboxylic acid compound selected from the group consisting of maleic acid, fumaric acid, itaconic acid, and their anyhdrides with at least about two molar proportions of a monohydroxy acid of the formula above set forth such, for example, as malic acid, lactic acid, glycolic acid, hydroxy butyric acid, hydroxy valeric acid, and hydroxy caproic acid. These esters can be modified further in accordance with the teachings of application Serial No. 772,725, filed Nov. 10, 1958 now U.S. Patent No. 3,007,901, above referred to. Thus, for example, a monohydric alcohol such as methanol, ethanol, propanol, butanol, and mixtures thereof can be incorporated into the reaction mixture, prior to carrying out the reaction, whereby mixed ester-lactones are obtained.

Reference is hereby made to patent 2,861,056 and to application Serial No. 772,725, filed Nov. 10, 1958 now U.S. Patent No. 3,007,901, for a detailed description of the resinous carboxy ester-lactones and their method of preparation.

The cellulose organic acid esters containing dicarboxylic acid groups are well known in the art. Such resins and their method of preparation are disclosed and described in Patent 2,093,462.

Polyvinyl phthalate and polyvinyl acetate phthalate resins are known in the art. These resins and their method of manufacture are described in Patent 2,484,415. Thus, for example, polyvinyl acetate phthalate can be prepared by reacting polyvinyl acetate having free esterifiable hydroxyl groups with phthalic anhydride and pyridene, the pyridine being present in an amount less than sufficient to combine with all the carboxyl groups present after the esterification is completed. Polyvinyl phthalate can be prepared in a similar manner except the polyvinyl alcohol is used as a reactant in place of the polyvinyl acetate.

The ethyl cellulose phthalates also are well known resinous materials. The ethyl cellulose phthalates that are particularly useful in carrying out this invention have an ethoxyl content of from about 36 percent to 38 percent and phthalyl content of from about 6 percent to 35 percent. The alkali or ammonium salts from these resins are soluble in water or in ethanol at a temperature of from about 50° F. to 70° F. These resins can be derived by the reaction of ethyl cellulose and phthalic anhydride by the method disclosed in Patent 2,753,339. Reference is hereby made to this patent.

While most known antistatic agents can be employed satisfactorily in carrying out this invention, it is preferred to use those antistatic set forth in more particularly in the description thereof that fellows. Ordinarily the amount of antistatic agent employed in preparing the composition of this invention will vary from about 0.2 part by weight to 2.0 parts by weight based on one part by weight of the water-insoluble, alkali-soluble resin employed in admixture therewith.

Particularly suitable antistatic agents for use in this invention include the alkali metal or the amine salts of sulfonated naphthalene formaldehyde condensates. Compounds of this type are available commercially under the proprietary name Daxad 11. These compounds are relatively neutral amorphous solids having little or no odor, are quite soluble in water, and are compatible with water-organic solvent mixtures. When dissolved in water at low concentrations, they are usually clear, colorless solutions without odor which do not decompose on standing.

If the above mentioned salts of sulfonated naphthalene formaldehyde condensates are employed as the antistatic agent in carrying out this invention, it is preferred that there be incorporated therewith an alkyl aryl sulfonate such, for example, as sodium dodecyl benzene sulfonate (available commercially under the proprietary name Padasol). By incorporating with the alkali metal or amine salt of a sulfonated naphthalene formaldehyde condensate the above alkyl aryl sulfonate, coatings applied in accordance with this invention are substantially free from streaks, blemishes, haze, and the like.

A particularly suitable composition of this type is comprised of from about 30 percent to 95 percent by weight of the alkali metal or amine salt of sulfonated naphthalene formaldehyde condensate such, for example, as that available commercially under the proprietary name Daxad 11, and from about 5 percent to 70 percent by weight of an alkyl aryl sulfonate such, for example, as sodium dodecyl benzene sulfonate.

Other highly satisfactory antistatic agents or compounds for use in this invention are those disclosed in Patent 2,882,157 to C. B. Thompson et al. These antistatic compounds include poly-beta-methacrylyloxyethyldiethylmethyl ammonium methylsulfate, poly-beta-methacrylyloxyethyl-di-n-propylmethyl ammonium methylsulfate, poly-beta-methacrylyloxyethyldiisopropylmethyl ammonium methylsulfate, poly-beta-methacrylyloxyethyldipropylethyl ammonium ethylsulfate, poly-beta-methacrylyloxyethyltriethyl ammonium ethylsulfate; and mixtures thereof. When any of the above enumerated compounds is employed as the antistatic compound in preparing the novel composition of this invention, it is preferred to employ in admixture therewith a spreading agent such as sodium hexadecenyl sulfate. Also to aid in the application of a coating composition of this invention in which the above antistatic compound is employed, it is recommended that there be admixed therewith a small amount of a terpene hydrocarbon and a $C_8$ alcohol.

The following example is illustrative of a composition for use in carrying out this invention which is comprised of the antistatic compound disclosed in Patent 2,882,157. All parts are by weight unless otherwise indicated.

EXAMPLE I

About 18.4 parts of sodium hexadecenyl sulfate (25 percent to 30 percent aqueous paste); 6.15 parts of mixed monocyclic terpene hydrocarbons; 4.9 parts of 95 percent ethanol (isopropanol can be employed for all or part of the ethanol); and 3.05 parts of $C_8$ alcohol (primarily n-octanol) are admixed and there is provided a clear, light yellow liquid; this liquid is added slowly with agitation to a mixture of 50 parts of a 30 percent aqueous solution of poly-beta-methacrylyloxyethyldiethylmethyl ammonium methylsulfate and 17.5 parts of water. A viscous pourable white dispersion is formed which is stable.

The preparation of poly-beta-methacrylyloxyethyldiethylmethyl ammonium methylsulfate is described in Patent 2,882,157, above referred to. Reference is made to this patent for a full and complete description of the antistatic compounds above described.

Adhesion promoters (c) suitable for use in this invention can be those having the structural formula

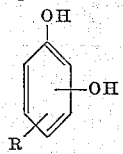

wherein R can be hydrogen; a lower alkyl radical of from about 1 to 6 carbon atoms, such as methyl, ethyl, propyl, n-butyl, and hexyl; a halogen such as chlorine, bromine, or iodine; or a hydroxyl radical. Specific examples of these compounds include resorcinol, pyrocatechol, pyrogallol, hydroquinone, orcinol, and chlororesorcinol.

Other suitable adhesion promoters that can be employed in carrying out this invention include trichloroacetic acid, ethylene carbonate, chloral hydrate (2,2,2-trichloro-1,1-ethanediol), chloro thymol, and ortho cresol. Mixtures of two or more of these adhesion promoters can be employed if desired.

The amount of the adhesion promoter (c) employed can be varied over a relatively wide range. It has been determined, however, that from about 1.0 part by weight to 3.0 parts by weight of adhesion promoter based on one part by weight of the water-insoluble, alkali-soluble resin produces satisfactory results.

As previously set forth, it is preferred to apply the antistatic layer of this invention to the surface of the polyester film support in an aqueous medium or vehicle. Thus, the antistatic composition is thoroughly admixed with water to provide a water solution or a water dispersion thereof depending upon the water solubility of all the compounds employed in the composition. Owing to the fact that the resins employed are substantially water-insoluble, it is preferred to render them water-soluble by admixing therewith a small amount of ammonia whereby there is provided the ammonium salt of the resin which is water-soluble. The amount of ammonia (28 percent water solution) employed will usually be from about 0.3 part to 1.0 part by weight based on one part by weight of the resin. After application, the ammonia is removed by the application of heat and the water-insolubility property of the resin is reestablished.

Suitable spreading agents can be added or incorporated into the aqueous solution or dispersion of the composition of this invention to provide for more satisfactorily applying the coating to the surface of the polyester film support. Suitable spreading agents are well known and include saponin, polyglycerol monolaurate, and the sodium salts of alkyl aryl sulfonates. The amount of spreading agent employed can be varied over a wide range and it is well within the skill of those versed in the art to incorporate into the composition the desired amount. Usually, the amount employed will vary from about 0.05 part by weight to 0.35 part by weight based on one part by weight of the resin employed in preparing the composition.

The following examples are illustrative of suitable coating compositions for use in carrying out this invention. The ingredients are thoroughly admixed prior to application.

EXAMPLE II

| Ingredient: | Percent by weight |
| --- | --- |
| Resorcinol | 5.0 |
| 60% butyl methacrylate-40% methacrylic acid copolymer | 2.0 |
| Ammonia (28% NH₃ in water) | 1.0 |
| Sodium salt of a sulfonated naphthalene formaldehyde condensate (Daxad 11) | 1.0 |
| Sodium salt of alkyl aryl sulfonate (Padasol) | 0.1 |
| Distilled water | balance to 100 |

EXAMPLE III

| Ingredient: | Percent by weight |
| --- | --- |
| Resorcinol | 5.0 |
| Ethyl cellulose phthalate | 2.0 |
| Ammonia (28% NH₃ in water) | 1.0 |
| Composition of Example I | 3.5 |
| Distilled water | balance to 100 |

EXAMPLE IV

| Ingredient: | Percent by weight |
| --- | --- |
| Resorcinol | 5.0 |
| 60% butyl methacrylate-40% methacrylic acid copolymer | 2.0 |
| Ammonia (28% NH₃ in water) | 1.0 |
| Saponin | 0.3 |
| Sulfonated polystyrene (antistatic agent) | 1.0 |
| Distilled water | balance to 100 |

While the above examples are illustrative of specific coating compositions for use in carrying out this invention, it is to be understood that equally satisfactory coating compositions can be prepared by employing any of the other enumerated water-insoluble, alkali-soluble resins, antistatic agents, or adhesion promoters in place of those employed in the specific examples.

The aqueous coating composition of Example II is applied by roller application directly to a biaxially oriented crystalline polyethyelne terephthalate film support and subsequently dried by the application of heat and the ammonia is substantially all removed from the applied coating. The resulting antistatic layer is well bonded and firmly adherent to the surface of the polyethylene terephthalate film support.

The aqueous coating composition of Example III is applied to a surface of a biaxially oriented crystalline polyethylene terephthalate film support in a manner similar to that described in Example II to provide a composite film element comprised of the polyethylene terephthalate film support and an antistatic layer which layer is well bonded and firmly adherent to the surface of the polyethylene terephthalate and is capable of withstanding the abuse to which it is subjected during use.

The aqueous coating composition of Example IV is applied to a surface of a biaxially oriented crystalline polyethylene terephthalate film support in a manner similar to that described in Example II. The resulting composite film element is comprised of the polyethylene terephthalate film support and a well bonded antistatic layer.

All the above antistatic backings or layers, while firmly bonded to the surface of a polyethylene terephthalate film support, are readily soluble in common alkaline photographic developers leaving the basically inert polyethylene terephthalate film support free of any foreign material.

A gelatinous silver halide emulsion layer can be applied to the composite film element of this invention to provide a highly satisfactory photographic film product. A highly satisfactory method for this purpose is disclosed in application Serial No. 15,542, filed Mar. 17, 1960, now U.S. Patent No. 3,143,421 reference to which is hereby made. Thus, for example, the uncoated surface of the composite film element can be coated with an aqueous coating composition comprising a copolymer of methyl acrylate, vinylidene chloride, and itaconic acid and from about 0.1 percent to 5 percent by weight of resorcinol. The applied coating is subsequently dried whereby substantially all the water is removed therefrom and there is applied to this layer a gelatin layer. To the thus applied gelatin subbing layer there is then applied a gelatinous silver halide light sensitive emulsion layer to provide a photographic film product.

Further, the antistatic layer of this invention can be conveniently applied to the photographic film products disclosed and described in application Serial No. 15,542, filed Mar. 17, 1960 now U.S. Patent No. 3,143,421, to provide equally satisfactory photographic film products.

In FIGURE 1 of the drawing there is shown a composite film element 10 of this invention which is comprised of a polyester film support 12 and an antistatic layer 14 comprised of a water-insoluble, alkali-soluble resinous vehicle, an antistatic compound, and an adhesion promoter.

In FIGURE 2 of the drawing there is shown a photographic film product 20 which is comprised of the composite film element of this invention. The photographic film product 20 is comprised of a polyester film support 22, an antistatic layer 24 comprised of the novel composition of this invention, a subbing layer 26, and a light sensitive silver halide emulsion layer 28. It is to be understood that other subbing layers in addition to the single subbing layer 26 can be employed if desired or required to provide a satisfactory film product. Suitable subbing layers for this purpose are disclosed and described in application Serial No. 15,542, filed Mar. 17, 1960 now U.S. Patent No. 3,143,421.

It is to be understood that the above description, drawing, and examples are illustrative of this invention and not in limitation thereof.

We claim:

1. A composition of matter comprising (a) a water-insoluble, alkali-soluble resin, (b) an antistatic compound, and (c) a compound selected from the group consisting of resorcinol, pyrocatechol, pyrogallol, hydroquinone, orcinol, chloroesorcinol, trichloroacetic acid, ethylene carbonate, chloral hydrate, chloro thymol, and ortho-cresol.

2. A composition of matter comprising (a) a water-insoluble, alkali-soluble resin selected from the group consisting of copolymers of alkyl methacrylates and methacrylic acid, carboxy ester-lactones, polyvinyl phthalates, polyvinyl acetate phthalates, ethyl cellulose phthalates, and cellulose organic acid esters containing dicarboxylic acid groups, (b) an antistatic compound, and (c) a compound selected from the group consisting of resorcinol, pyrocatechol, pyrogallol, hydroquinone, orcinol, chlororesorcinol, trichloroacetic acid, ethylene carbonate, chloral hydrate, chloro thymol, and ortho-cresol.

3. A composition of matter comprising (a) a butyl methacrylate-methacrylic acid copolymer, (b) at least one antistatic compound, and (c) resorcinol.

4. A composite film element comprising (1) a polyester film support and (2) a highly adherent firmly bonded antistatic layer comprising (a) a water-insoluble, alkali soluble resin, (b) an antistatic compound, and (c) a compound selected from the group consisting of resorcinol, pyrocatechol, pyrogallol, hydroquinone, orcinol, chlororesorcinol, trichloroacetic acid, ethylene carbonate, chloral hydrate, chloro thymol, and ortho-cresol, said antistatic layer being easily and readily soluble and removable in alkaline photographic processing solutions said antistatic layer being bonded directly to a surface of the polyester film support.

5. A composite film element comprising (1) a polyester film support and (2) a highly adherent and firmly bonded antistatic layer comprising (a) a water-insoluble, alkali-soluble resin selected from the group consisting of copolymers of alkyl methacrylates and methacrylic acid, carboxy ester-lactones, polyvinyl phthalates, polyvinyl acetate phthalates, ethyl cellulose phthalates, and cellulose organic acid esters containing dicarboxylic acid groups, (b) an antistatic compound, and (c) a compound selected from the group consisting of resorcinol, pyrocatechol, pyrogallol, hydroquinone, orcinol, chlororesorcinol, tricholoracetic acid, ethylene carbonate, chloral hydrate, chloro thymol, and ortho-cresol said antistatic layer being bonded directly to a surface of the polyester film support.

6. A composite film element comprising (1) a polyester film support and (2) a highly adherent and firmly bonded antistatic layer comprising (a) a butyl methacrylate-methacrylic acid copolymer, (b) an antistatic compound, and (c) resorcinol said antistatic layer being bonded directly to a surface of the polyester film support.

7. A photographic film product comprising (1) a polyester film support, (2) at least one antistatic layer comprising (a) a water-insoluble, alkali-soluble resin, (b) an antistatic compound, and (c) a compound selected from the group consisting of resorcinol, pyrocatechol, pyrogallol, hydroquinone, orcinol, chloresorcinol, trichloroacetic acid, ethylene carbonate, chlorol hydrate, chloro thymol, and ortho-cresol, said antihalation layer being firmly bonded to a surface of the polyester film support but easily and readily removable in alkaline photographic processing solutions, and (3) a light-sensitive silver halide emulsion layer said antistatic layer being bonded directly to a surface of the polyester film support on the side opposite the light-sensitive layer.

8. A photographic film product comprising (1) a polyester film support, (2) at least one antistatic layer comprising (a) a water-insoluble, alkali-soluble resin selected from the group consisting of copolymers of alkyl methacrylates and methacrylic acid, carboxy ester-lactones, polyvinyl phthalates, polyvinyl acetate phthalates, ethyl-cellulose phthalates, and cellulose organic acid esters containing dicarboxylic acid groups, (b) an antistatic compound, and (c) a compound selected from the group consisting of resorcinol, pyrocatechol, pyrogallol, hydroquinone, orcinol, chlorosorcinol, trichloroacetic acid, ethylene carbonate, chloral hydrate, chloro thymol, and ortho-cresol, and (3) a light-senstive silver halide emulsion layer said antistatic layer being bonded directly to a surface of the polyester film support on the side opposite the light-sensitive layer.

9. A photographic film product comprising (1) a polyester film support, (2) at least one antistatic layer comprising (a) a butyl methacrylate-methacrylic acid copolymer, (b) at least one antistatic composition, and (c) resorcinol, said antihalation layer being firmly bonded to a surface of the polyester film support but easily and readily removable in alkaline photographic processing solutions, and (3) a light-sensitive emulsion layer said antistatic layer being bonded directly to a surface of the polyester film support on the side opposite the light-sensitive layer.

References Cited by the Examiner

UNITED STATES PATENTS

| | | | |
|---|---|---|---|
| 2,391,181 | 12/45 | Minsk | 96—87 X |
| 2,976,168 | 3/61 | Thompson et al. | 96—84 |

FOREIGN PATENTS 782,165  9/57  Great Britain.

NORMAN G. TORCHIN, *Primary Examiner.*

PHILIP E. MANGAN, *Examiner.*

UNITED STATES PATENT OFFICE
CERTIFICATE OF CORRECTION

Patent No. 3,201,251                                        August 17, 1965

Gale F. Nadeau et al.

It is hereby certified that error appears in the above numbered patent requiring correction and that the said Letters Patent should read as corrected below.

Column 2, line 67, for "polyinvyl" read -- polyvinyl --; column 4, line 3, after "antistatic" insert -- agents --; same line 3, for "particularly" read -- particularity --; column 4, line 4, for "fellows" read -- follows --; column 7, line 29, and column 8, line 18, for "chloroesorcinol", each occurrence, read -- chlororesorcinol --; column 8, line 37, for "chlorosorcinol" read -- chlororesorcinol --; line 50, after "light-sensitive" insert -- silver halide --.

Signed and sealed this 8th day of March 1966.

(SEAL)

Attest:

ERNEST W. SWIDER
Attesting Officer

EDWARD J. BRENNER
Commissioner of Patents